United States Patent [19]
Ramesh et al.

[11] Patent Number: 5,870,406
[45] Date of Patent: Feb. 9, 1999

[54] AUTOMATIC REPEAT REQUEST(ARQ) DATA COMMUNICATIONS METHOD AND APPARATUS

[75] Inventors: Rajaram Ramesh; Ravinder D. Koilpillai, both of Cary, N.C.; Jacobus C. Haartsen, Staffanstorp, Sweden

[73] Assignee: Ericsson Inc., Research Triangle Park, N.C.

[21] Appl. No.: 803,184

[22] Filed: Feb. 19, 1997

[51] Int. Cl.⁶ .................................................. G06F 11/00
[52] U.S. Cl. .............................................. 371/6; 371/32
[58] Field of Search .................................... 371/6, 32, 33, 371/35, 69.1

[56] References Cited

U.S. PATENT DOCUMENTS

| | | | |
|---|---|---|---|
| 4,128,809 | 12/1978 | Kage | 325/324 |
| 4,577,332 | 3/1986 | Brenig | 375/40 |
| 4,852,105 | 7/1989 | Kurz | 371/69.1 |
| 5,241,548 | 8/1993 | Dillon et al. | 371/69.1 |
| 5,463,646 | 10/1995 | Dillon et al. | 371/69.1 |
| 5,550,847 | 8/1996 | Zhu | 371/32 |
| 5,596,588 | 1/1997 | Notutoki et al. | 371/32 |
| 5,600,663 | 2/1997 | Ayanoglu et al. | 371/41 |
| 5,742,502 | 4/1998 | King | 364/148 |

FOREIGN PATENT DOCUMENTS

WO 91/20142  12/1991  WIPO.
WO 92/21085  11/1992  WIPO.

OTHER PUBLICATIONS

PCT Search Report, Jun. 24, 1998, PCT/US 98/02937.

Metzner, John J., "Efficient Selective Repeat ARQ Strategies for Very Noisy and Fluctuating Channels", May, 1985, IEEE Transactions on Communications, vol. Com–33, No. 5, pp. 409–416.

*Primary Examiner*—Joseph E. Palys
*Attorney, Agent, or Firm*—Jenkens & Gilchrist

[57] ABSTRACT

If no uncorrectable errors are discovered in a received data packet, an acknowledgment is sent back to the sender. Conversely, if the data packet contains uncorrectable errors, no acknowledgment is sent, forcing a re-transmission of that data packet in accordance with an automatic repeat request (ARQ) procedure. In such cases, sets of unquantized signal values relating to received data packets having uncorrectable errors are stored. When two or more sets of unquantized signal values for the same received data packet (as re-transmitted) have been stored, the unquantized signal values are numerically combined on a bit-by-bit basis, and then quantized to regenerate a combined data packet. If no uncorrectable errors are discovered in that combined data packet, an acknowledgment is sent back to the sender. Otherwise, no acknowledgment is sent, forcing another data packet re-transmission.

19 Claims, 3 Drawing Sheets

| | | | | | |
|---|---|---|---|---|---|
| 10101111 | 11001010 | 00000010 | 01111110 | 10000011 | TRANSMITTED DATA WORD |
| X01011X1 | 11001X10 | XX00001X | 0X111110 | 10XX0011 | RECEIVED WORD 1 |
| 101X1111 | 11X01010 | 000X00X0 | 01X11X1X | 1000001X | RECEIVED WORD 2  X=ERROR |
| 10101111 | X10X10XX | 00X00010 | 011X1110 | 1000X011 | RECEIVED WORD 3 |
| 10101111 | 11001010 | 00000010 | 01111110 | 10000011 | ERROR CORRECTED RESULT |
FIG. 2
(PRIOR ART)
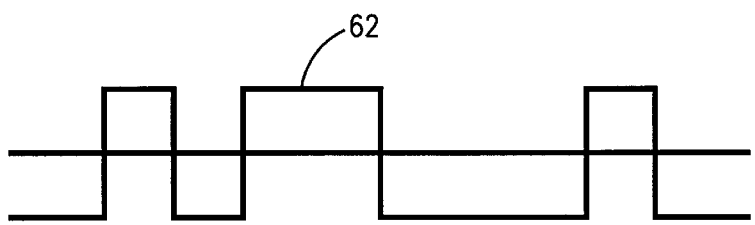
FIG. 4A
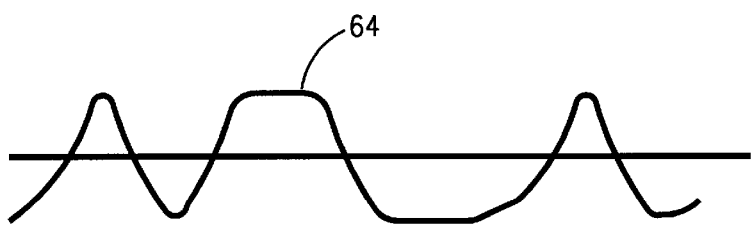
FIG. 4B
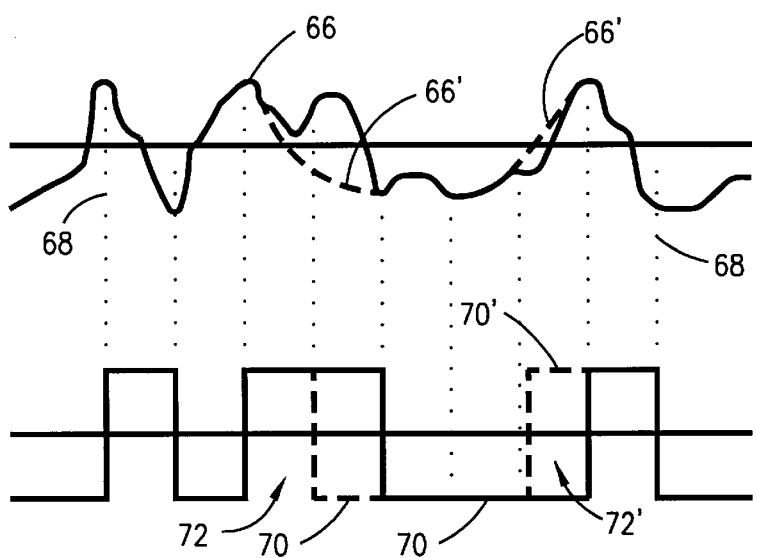
FIG. 4C
FIG. 4D

| 1 | 0 | 0 | 1 | 1 | 1 | 0 | 0 | 1 | TRANSMITTED DATA PACKET |
|---|---|---|---|---|---|---|---|---|---|
| .463 | .021 | .143 | .926 | .980 | .732 | .603 | .061 | .922 | UNQUANTIZED DATA PACKET 1 |
| X | 0 | 0 | 1 | 1 | 1 | X | 0 | 1 | RECEIVED DATA PACKET 1 |
| .872 | .009 | .523 | .902 | .874 | .808 | .091 | .042 | .844 | UNQUANTIZED DATA PACKET 2 |
| 1 | 0 | X | 1 | 1 | 1 | 0 | 0 | 1 | RECEIVED DATA PACKET 2 |
| 1.335 | .030 | .666 | 1.828 | 1.854 | 1.540 | .694 | .103 | 1.766 | NUMERICAL COMBINATION |
| 1 | 0 | 0 | 1 | 1 | 1 | 0 | 0 | 1 | COMBINED DATA PACKET |

X = ERROR

AUTOMATIC REPEAT REQUEST (ARQ) DATA COMMUNICATIONS METHOD AND APPARATUS

BACKGROUND OF THE INVENTION

1. Technical Field of the Invention

The present invention relates to data communications and, in particular, to a method and apparatus for implementing an improved automatic repeat request (ARQ) data communications procedure.

2. Description of Related Art

There exist many applications where large volumes of digital data must be transmitted and received in a substantially error free manner. In telecommunications and satellite communications systems, in particular, it is imperative that the transmission of digital data be completed in as accurate a manner as is possible. Accurate transmission and reception of digital data has, however, been difficult because the communications channels utilized for data transmissions are plagued by error introducing factors. For example, such errors may be attributable to transient conditions in the channel (like noise and distortion), or may be due to recurrent conditions attributable to defects in the channel. The existence of transient conditions or defects results in instances where the digital data is not transmitted properly or cannot be reliably received.

Digital data is often transmitted in packets (or blocks or frames), wherein each data packet comprises a plurality of information bytes followed by a frame check sequence of bits. The errors that typically occur in the transmission and reception of digital data are of two types generally referred to as "channel errors". The first type, termed a "random" or isolated error, occurs in a single bit when there is a substitution of one value, in a two value binary bit system, for its opposite value. The second type, termed a "burst" error, occurs when a continuous sequence of adjacent bits are in error. The included frame check sequence is used to detect when and where a channel error has been introduced into the data packet.

Considerable attention has been directed toward discovering methods for addressing the instances of errors which typically accompany data transmission activities. For example, it is common to encode the transmitted data and then use the subsequent decoding process to further correct detected errors. It is also well known in the art to employ an automatic repeat request (ARQ) procedure to address instances wherein receiver processing of the included frame check sequence indicates that a channel error has occurred. When a data packet is successfully received in an error-free condition, the receiver sends an acknowledgment message to the message sender. Responsive to receipt and detection of an error including data packet, however, no acknowledgment message is sent indicating to the message sender that the data packet was not successfully received and should accordingly be retransmitted. Following the expiration of a predetermined time-out period without receipt of the acknowledgment, the data packet is automatically re-transmitted by the sender.

It is not an unusual occurrence for even the subsequent repeat transmission of a data packet in accordance with the automatic repeat request procedure to also include a channel error. In one solution to this problem, the data packet is repeatedly re-transmitted by the message sender until a successful, error-free transmission is accomplished (i.e., until the receiver sends the acknowledgment). Alternatively, the prior art discloses a system wherein the bit values of multiple, total numbering odd, re-transmissions of the same data packet including detected channel errors are stored, and a bit-wise majority vote is performed on the stored data packets to generate a new test data packet against which the frame check sequence is applied to detect any included errors. If the new test data packet passes the frame check analysis, it is output as valid and an acknowledgment message is sent by the receiver to the message sender confirming successful message transmission.

SUMMARY OF THE INVENTION

The present invention comprises a method and apparatus for implementing an automatic repeat request (ARQ) data communications procedure wherein a received data packet waveform is sampled. The sampled signal values are then quantized to regenerate the data packet, and the regenerated data packet is subjected to an error detection process. If no uncorrectable errors are discovered in the regenerated data packet, an acknowledgment is sent back to the sender. Conversely, if the regenerated data packet contains uncorrectable errors, no acknowledgment is sent, forcing a subsequent re-transmission of that data packet. At that point, a set of unquantized signal values for that error containing data packet is stored. When two or more sets of unquantized signal values for the same data packet (as re-transmitted, but again containing uncorrectable errors) have been stored, the unquantized signal values are numerically combined on a bit-by-bit basis to generate a combined set of unquantized signal values for that data packet. The combined set is then quantized to regenerate a combined data packet, and the regenerated combined data packet is subjected to the error detection process. If no uncorrectable errors are discovered, an acknowledgment is sent back to the sender. Conversely, if the regenerated combined data packet contains uncorrectable errors, no acknowledgment is sent, forcing another automatic data packet re-transmission.

BRIEF DESCRIPTION OF THE DRAWINGS

A more complete understanding of the method and apparatus of the present invention may be acquired by reference to the following Detailed Description when taken in conjunction with the accompanying Drawings wherein:

FIG. 2 shows an example of the bit-wise majority vote used in the process of FIG. 1;

FIG. 4A is a waveform diagram illustrating the shape of a transmitted data signal in the system of FIG. 3;

FIG. 4B is a waveform diagram illustrating the shape of the transmitted data signal as distorted by transmission over a communications channel;

FIG. 4C is a waveform diagram illustrating the shape of the transmitted data signal as corrupted by noise on the communications channel;

FIG. 4D is a waveform diagram illustrating the shape of the regenerated data signal;

DETAILED DESCRIPTION OF THE DRAWINGS

Figure 1:
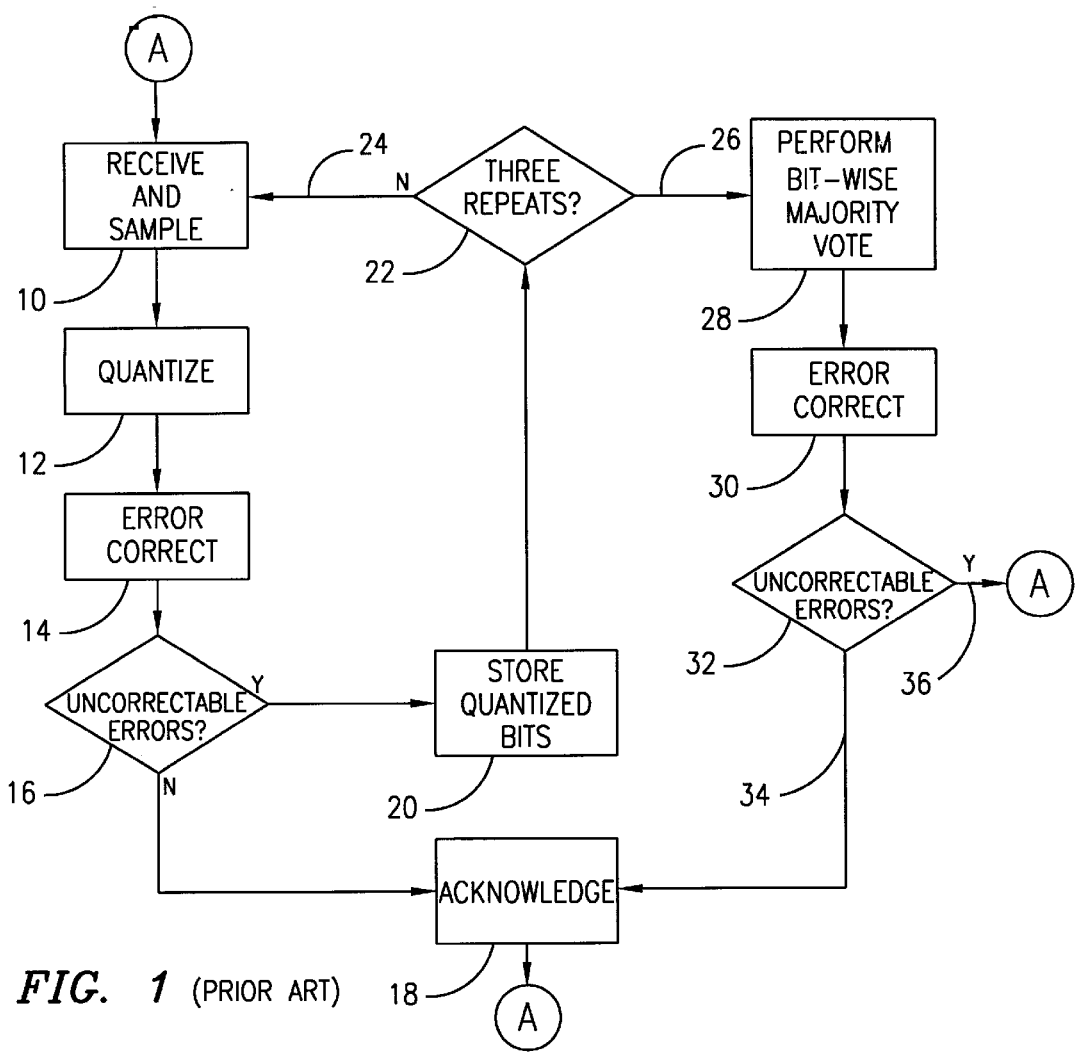
FIG. 1 is a flow diagram illustrating operation of a prior art automatic repeat request procedure.

Reference is now made to FIG. 1 wherein there is shown a flow diagram illustrating operation of a prior art automatic repeat request (ARQ) procedure. The process begins at step 10 where a data signal waveform is received and sampled. The sample signal values are then quantized (step 12) to regenerate the data signal. Error correction is then performed on each of the data words within the regenerated data signal (step 14). If no uncorrectable errors are found in a particular data word (decision step 16), an acknowledgment signal is transmitted back to the sender (step 18) and the data word is output. If the analysis of step 16 reveals that the particular data word contains uncorrectable errors, the quantized bits (ones and zeros) of that data word are stored in step 20, and no acknowledgment is sent. At decision step 22, it is determined whether three repeats of that same data word without the transmission of an acknowledgment have occurred. If not, the process returns (flow 24) back to await receipt of the data signal waveform in step 10 comprising a repeat data word transmission from the sender in accordance with the automatic repeat request procedure. Processing of this repeat transmission (steps 12, 14 and 16) may indicate error free reception, and an acknowledgment is sent (step 18). However, if three repeats have occurred without the transmission of an acknowledgment (flow 26), a majority bit-wise vote is performed in step 28 on the three previously stored quantized bits of the received data word (from step 20). Error correction is then performed on the new data word resulting from the majority bit-wise vote (step 30). If no uncorrectable errors are found in decision step 32 (flow 34), an acknowledgment signal is transmitted back to the sender (step 18) and the new data word is output. If the analysis of step 32 reveals that the new data word resulting from the majority bit-wise vote contains errors, no acknowledgment is sent, and the process returns (flow 36) back to await receipt of the data signal waveform in step 10 comprising a repeat data word transmission from the sender in accordance with the automatic repeat request procedure.

The boolean formula for the bit-wise majority vote operation of step 28 is as follows:

$$result = (word1 * word2) + (word1 * word3) + (word2 * word3)$$

The bit-wise majority vote accordingly logically ANDs the first stored data word with the second stored data word. Next, the first stored data word is logically ANDed with the third stored data word. Finally, the second stored data word is logically ANDed with the third stored data word. The results of the three ANDing operations are then logically ORed to produce the output new data word.

Reference is now additionally made to FIG. 2 wherein there is shown an example of the bit-wise majority vote of step 28 used in the process of FIG. 1. In FIG. 2, the first line of data words shows the error free, sender transmitted data words. The next three lines show the quantized bits of the data words as received (in multiple steps 10 and 12). In the illustrated cases, the error correction step 14 reveals that each of the data words contains certain uncorrectable bit errors designated by an "x" in various bit locations. The last line shows the error corrected new data word output result from the performance of the bit-wise majority vote of step 28. Although not illustrated, if an error is contained in the same bit position in two or three of the stored data words, the error is not corrected by the bit-wise majority vote and appears in the output new data word.

Figure 3:
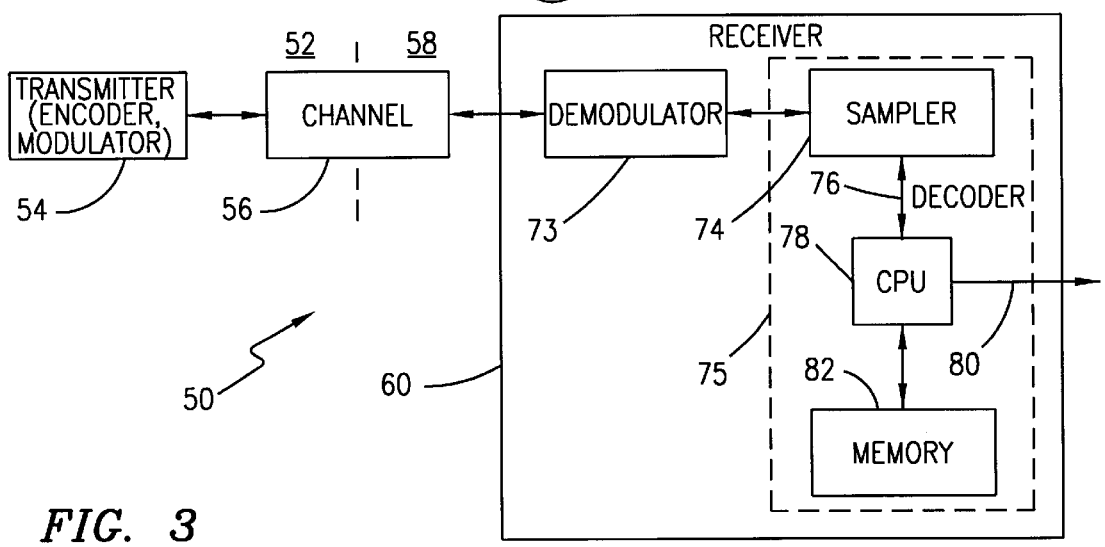
FIG. 3 is a block diagram of an automatic repeat request data communications system of the present invention.

Reference is now made to FIG. 3 wherein there is shown a block diagram of an automatic repeat request data communications system 50 of the present invention. On a transmit side 52 of the system 50, a data stream comprised of data packets is output from a transmitter 54 for transmission over a communications channel 56. The transmitter 54 of the transmit side 52 of the system 50 includes an encoding and a modulating element (not explicitly shown) for processing the data stream. On a receive side 58 of the system 50, a corresponding receiver 60 receives the transmitted data stream. The receiver 60 of the receive side 58 performs corresponding demodulating and decoding functions necessary for processing the transmitted data stream.

The communications channel 56 may introduce a number of errors into the transmitted data packets of the data stream. These errors may be introduced, for example, by the effects of distortion and noise, as well as from other factors well known to those skilled in the art. The transmitter 54 functions to include within each data packet a plurality of check bits comprising a frame check useful on the receive side 58 by the receiver 60 in detecting and correcting introduced channel errors.

In instances where the receiver 60 is capable of detecting and correcting all introduced channel errors within a particular data packet using the frame check, an acknowledgment signal is sent by the receiver back to the transmitter 54 of the system 50 indicating that proper receipt of the data stream has occurred. Conversely, in instances where uncorrected errors remain after receiver 60 processing, no acknowledgment is sent back to the transmitter 54. After the expiration of a predetermined time-out period without receipt of an acknowledgment from the receiver 60, the transmitter 54 automatically re-transmits the non-acknowledged data packet. Systems 50 operating in this manner are generally referred to as automatic repeat request (ARQ) systems.

Reference is now made to FIG. 4A wherein there is shown a waveform diagram illustrating the shape of a transmitted data stream signal 62 (exemplary in nature) output from the transmitter 54. Following transmission through the communications channel 56, the signal 62 may take the shape of the signals 64 and 66 illustrated in FIGS. 4B and 4C due, for example, to the effects of distortion and noise corruption, respectively. The receiver 60 functions to sample the received data signal 66 waveform, as graphically illustrated at each sample point 68 in FIG. 4C, and then quantize the sampled signal values to output signal 70 shown in FIG. 4D, effectively regenerating the originally transmitted data signal 62.

Instances frequently occur in data signal transmission over a communications channel 56 where distortion, noise corruption, or other channel error introducing factors adversely affect the shape of the received data signal 66 waveform and introduce an error. The sampled 68 values from the received signal 66 may, when quantized by the receiver 60, result in the presence within the regenerated data signal 70 of an incorrect logical one in place of a correct logical zero, or vice versa. This effect is graphically shown in FIGS. 4C and 4D with respect to the broken waveform signals 66' and 70', with the introduced bit error generally indicated at 72 (a switch from a logical one to a logical zero) and at 72' (a switch from a logical zero to a logical one).

Reference is now once again made to FIG. 3. The receiver 60 includes a demodulator 73 for demodulating the transmitted data signal and a decoder 75 for decoding the demodulated signal for output on line 80. An included sampler 74 takes samples 68 (FIG. 4C) of the demodulated received data signal waveform output 66 from the demodulator 73. The output 76 from the sampler 74 comprises the unquantized signal values for the received and sampled data signal waveform. These values are input to a processing unit 78 where they are quantized in a well known manner to regenerate the data signal 70 (FIG. 4D) including data packets. The processing unit 78 then decodes the data signal 70 and uses the included frame check within each data packet to locate and perhaps correct included bit errors. If it is determined during this process that a data packet within the regenerated data signal 70 does not include any uncorrectable errors, the decoded data is output from the receiver 60 on line 80, and the processing unit 78 generates and sends an acknowledgment message relating to that packet back to the transmitter 54 over the communications channel 56.

In the event that a data packet within the regenerated data signal 70 does include uncorrectable errors, no acknowledgment message relating to that data packet is sent by the receiver 60 back to the transmitter 54 over the communications channel 56, and a set of unquantized signal values for the portion of the received and sampled data signal waveform corresponding to that error including data packet are saved in a memory 82. When two or more sets of unquantized signal values for the same data packet (multiply received with uncorrectable errors) have been saved in the memory 82, the processing unit 78 extracts the sets of values from the memory and numerically combines the unquantized signal values on a bit-by-bit basis to generate a combined set of unquantized signal values for that data packet. These values are then quantized by the processing unit 78 to regenerate a combined data packet. The regenerated combined data packet is then decoded with the included frame check used by the processing unit 78 to locate and perhaps correct included bit errors. If it is determined during this process that the regenerated combined data packet does not include any uncorrectable errors, the decoded data is output from the receiver 60 on line 80, and the processing unit 78 generates and sends an acknowledgment message relating to that data packet (as most recently re-transmitted) back to the transmitter 54 over the communications channel 56. If the regenerated combined data packet does include uncorrectable errors, no acknowledgment message relating to that packet is sent by the receiver 60 to the transmitter 54. In accordance with the automatic repeat request procedure, the receiver 60 then awaits a re-transmission of the non-acknowledged data packet following the expiration of the predetermined time-out period.

Figures 5, 6:
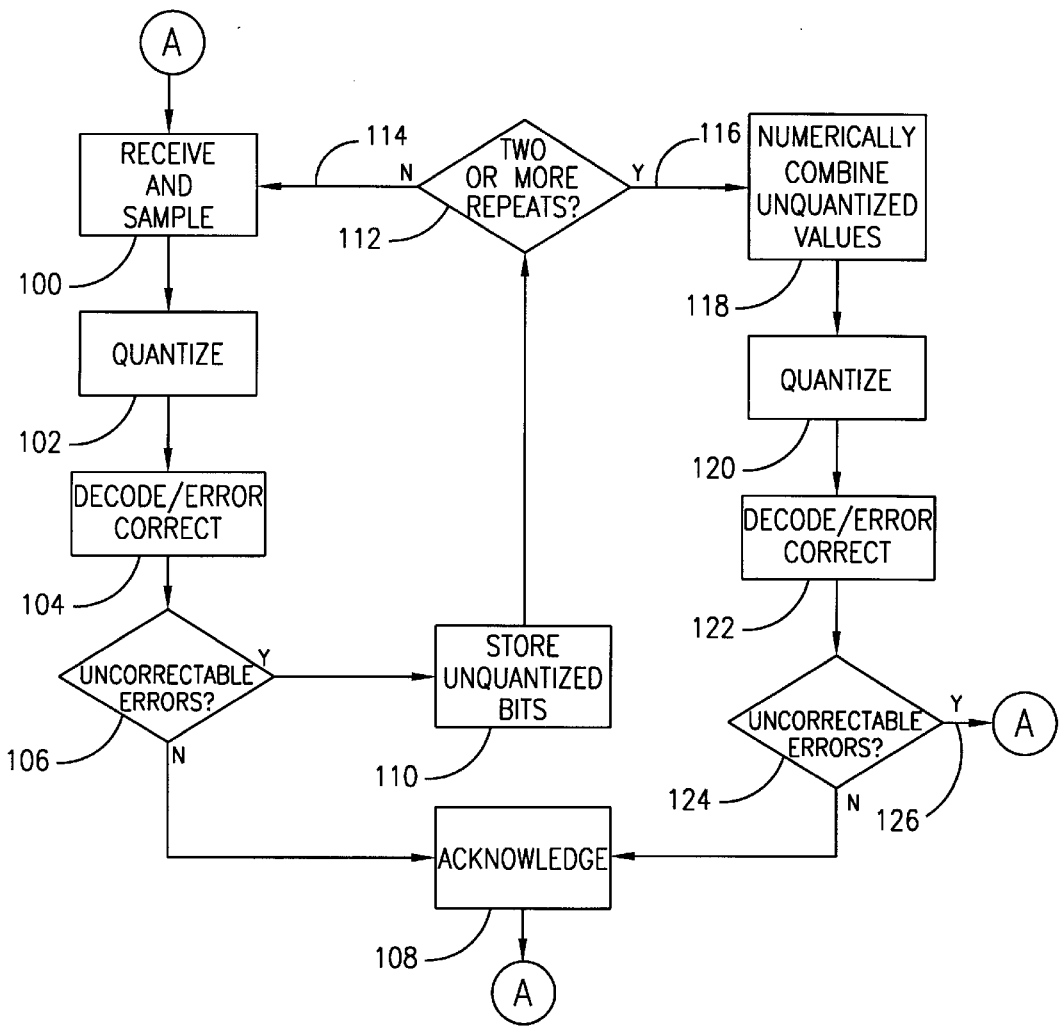
FIG. 5 is a flow diagram illustrating operation of a receiver for the automatic repeat request data communications system of FIG. 3.
FIG. 6 is a shows an example of the unquantized sample numerical combination used in the process of FIG. 5.

Reference is now made to FIG. 5 wherein there is shown a flow diagram illustrating operation of the receiver 54 for the automatic repeat request data communications system 50 of FIG. 3. The process begins at step 100 where a data signal waveform for a data packet is received and sampled. The signal values relating to the samples are then quantized (step 102) to regenerate the data packet. Decoding and error correction is then performed on the data packet (step 104) using the frame check. If no uncorrectable errors are found in that data packet (decision step 106), an acknowledgment signal is transmitted back to the sender (step 108) and the decoded data is output. If the analysis of step 106 reveals that the data packet contains uncorrectable errors, the unquantized signal values of the portion of the sampled data signal waveform relating to that data packet are stored in step 110, and no acknowledgment is sent. At decision step 112, it is determined whether at least two repeat transmissions of that same data packet without the transmission of an acknowledgment have occurred. If not, the process returns (flow 114) back to await receipt of the data signal waveform in step 100 comprising a repeat transmission from the sender of that same data packet. Processing of this repeat transmission (steps 102, 104 and 106) may indicate error free reception, and an acknowledgment is sent (step 108).

However, if at least two repeat transmissions have occurred without the transmission of an acknowledgment (flow 116), the step 110 stored unquantized signal values for each of the prior transmissions of the same data packet are combined numerically in step 118 to generate a combined set of unquantized signal values for that multiply transmitted data packet. The set is then quantized (step 120) to regenerate a combined data packet. Decoding and error correction is then performed on the combined data packet (step 122) using the frame check. If no uncorrectable errors are found in that combined data packet (decision step 124), an acknowledgment signal is transmitted back to the sender (step 108) in response to the most recently receiver error containing data packet transmission, and the decoded combined data is output. If the analysis of step 124 reveals that the combined data packet contains uncorrectable errors, no acknowledgment is sent, and the process returns to step 100 (flow 126) to await receipt of the data signal waveform comprising a repeat transmission from the sender of that same data packet in accordance with the automatic repeat request procedure.

Reference is now made to FIG. 6 wherein there is shown an example of the unquantized numerical combination performed in step 118 by the process of FIG. 5. In FIG. 6, the first line shows the error free, sender transmitted data packet. Lines two and four show the unquantized signal values for the data packets as received in multiple steps 100. Lines three and five show the quantized bits for the data packets shown in lines two and four, respectively. In the illustrated cases, the error correction step 104 reveals that each of the data packets contains certain uncorrectable errors designated by an "x" in various locations. The sixth line shows the numerical combination (in this case, for example, summing) in step 118 of the unquantized signal values for the data packets of lines two and four. The seventh line shows the regenerated combined data packet resulting from the performance of quantization step 120. The error correction step 122 reveals that the regenerated combined data packet contains no uncorrectable errors.

It was mentioned previously that the numerical combination of unquantized values (step 118) is performed with respect to retransmissions of the same data packet. The receiver 60 identifies "same" data packets by examining the header portion of each data packet which typically includes a sequence number or other identifying information for the data packet. Only the unquantized signal values for the data packets having the same sequence number (or identification) are to be combined. In some cases, however, because of included errors, it is impossible to accurately identify the header and hence the sequence number for the data packet. In such cases, step 118 numerically combines the sampled values for a most recently received erroneous data packet with the sampled values of previously received erroneous data packets. It is possible that the most recently received erroneous data packet is a repeat of one of the previously received erroneous data packets, and the combination (along with the quantization, decoding and error correcting of steps 120 and 122) of the two packets might yield a fruitful result.

As an alternative to the foregoing, and perhaps in addition thereto, the transmitter 54 encodes the data packets using a heavy coding on the header portion and a light coding on the data portion. By "heavy" it is meant a coding scheme that would allow the header portion of each data packet to be received and decoded more reliably for the purpose of identifying the sequence number (or identification). Thus, step 118 would numerically combine the sampled values for two of the same erroneous data packets identified from their heavily encoded, and error protected, sequence numbers. In instances where the heavy encoding is insufficient to protect against errors in the header, the foregoing process of numerically combining the sampled values for a most recently received erroneous data packet with the sampled values of previously received erroneous data packets is performed.

In instances where the data frame is encoded using multi-level symbols, a modified decoding process is performed. Decoding at the receiver is accomplished using metrics that are calculated based on the unquantized received symbols. Such decoding may be performed, for example, along the branches of a trellis. The decoded data is then checked for errors. If uncorrectable errors are discovered, the unquantized received symbols are stored. With the receipt of a re-transmission of the same data frame, decoding is again performed. If no uncorrectable errors are discovered, an acknowledgment is sent. Otherwise, decoding is performed jointly on the unquantized received symbols by combining metrics generated by received symbols. The metric may comprise a squared error metric, for example. After joint decoding, the frame is checked for errors, and then acknowledged if error free.

Although preferred embodiments of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method comprising the steps of:
   sampling a data signal waveform for a data packet to obtain a set of unquantized signal values for that data packet;
   quantizing the set of unquantized signal values to regenerate the data packet;
   determining whether the regenerated data packet includes uncorrectable errors;
   if so, storing the set of unquantized signal values relating to that regenerated data packet;
   determining whether at least two sets of unquantized signal values relating to the same data packet have been stored;
   if so, numerically combining the sets of unquantized signal values to generate a combined set of unquantized signal values for that same data packet;
   quantizing the combined set of unquantized signal values to regenerate a combined data packet; and
   determining whether the regenerated combined data packet includes uncorrectable errors.

2. The method as in claim 1 further including the step of transmitting an acknowledgment message to a sender of the data packet if the regenerated data packet does not include any uncorrectable errors.

3. The method as in claim 1 further including the step of transmitting an acknowledgment message to a sender of the data packet if the regenerated combined data packet does not include any uncorrectable errors.

4. The method as in claim 1 wherein the step of numerically combining comprises the step of summing the at least two sets of unquantized signal values relating to the same data packet.

5. The method as in claim 1 wherein each data packet includes a frame check, and wherein the step of determining whether the regenerated data packet includes uncorrectable errors comprises the step of performing an error correction analysis on the regenerated data packet using the frame check.

6. The method as in claim 1 wherein each data packet includes a frame check, and wherein the step of determining whether the regenerated combined data packet includes uncorrectable errors comprises the step of performing an error correction analysis on the regenerated combined data packet using the frame check.

7. The method as in claim 1 wherein the step of determining whether at least two sets of unquantized signal values relating to the same data packet have been stored comprises the step of identifying same data packets by matching data packet sequence numbers.

8. The method as in claim 7 wherein a portion of each data packet containing the sequence number is more heavily encoded than a portion of the data packet containing data.

9. The method as in claim 1 wherein the step of determining whether at least two sets of unquantized signal values relating to the same data packet have been stored comprises the step comparing a most recent data packet with prior data packets.

10. A receiver of a data signal waveform for a data packet, comprising:
    a sampler for sampling the data signal waveform to obtain a set of unquantized signal values for each data packet;
    a memory for storing sets of unquantized signal values for data packets containing uncorrectable errors; and
    a processor connected to the sampler and memory for numerically combining at least two sets of unquantized signal values for the same multiply received, uncorrectable error containing data packet to generate a combined set of unquantized signal values for that data packet, and for quantizing the combined set of unquantized signal values to regenerate a combined data packet, and for determining whether the regenerated combined data packet includes uncorrectable errors.

11. The receiver of claim 10 wherein the processor further functions to quantize the sampled sets of unquantized signal values to regenerate each data packet, and to determine whether each regenerated data packet includes uncorrectable errors, and if so to store the sets of unquantized signal values for the data packets containing uncorrectable errors in the memory.

12. The receiver of claim 11 wherein the processor still further functions to transmit an acknowledgment to a sender of a data packet if that data packet, as regenerated, does not include any uncorrectable errors.

13. The receiver of claim 11 wherein each data packet includes a frame check, and wherein the processor determines whether each regenerated data packet includes uncorrectable errors by performing an error correction analysis on the regenerated data packet using the frame check.

14. The receiver of claim 10 wherein the processor further functions to transmit an acknowledgment to a sender of a data packet if that data packet, as regenerated from combined sets of unquantized signal values, does not include any uncorrectable errors.

15. The receiver of claim 10 wherein each data packet includes a frame check, and wherein the processor determines whether each regenerated combined data packet includes uncorrectable errors by performing an error correction analysis on the regenerated combined data packet using the frame check.

16. The receiver of claim 10 wherein the processor identifies the same multiply received data packet by matching data packet sequence numbers.

17. The receiver of claim 16 wherein a portion of each data packet containing the sequence number is more heavily encoded than a portion of the data packet containing data.

18. The method as in claim 10 wherein the processor identifies the same multiply received data packet by comparing a most recent data packet with prior data packets.

19. A data packet communications system, comprising:
- a transmitter for transmitting data packets over a communications channel, and for re-transmitting data packets over the communications channel if their receipt is not acknowledged; and
- a receiver for receiving the data packets transmitted and re-transmitted over the communications link, the receiver:
    - acknowledging received data packets containing no uncorrectable errors;
    - storing a set of unquantized signal values for each data packet received containing uncorrectable errors;
    - numerically combining at least two sets of unquantized signal values for the same transmitted and retransmitted uncorrectable error containing data packet;
    - quantizing the combined unquantized signal values to regenerate a combined data packet;
    - testing the combined data packet for uncorrectable errors; and
    - acknowledging the uncorrectable error containing data packet retransmission if the combined data packet contains no uncorrectable errors.

* * * * *